United States Patent
Boinnard et al.

(10) Patent No.: US 12,306,468 B2
(45) Date of Patent: May 20, 2025

(54) EYEWEAR HAVING A PIVOTABLE LENS RETAINER

(71) Applicant: 100% SPEEDLAB, LLC, San Diego, CA (US)

(72) Inventors: Ludovic Francis Boinnard, San Diego, CA (US); Marc Guy Blanchard, Solana Beach, CA (US); Jerome Jacques Marie Mage, San Diego, CA (US)

(73) Assignee: 100% Speedlab, LLC, San Diego, CA (US)

( * ) Notice: Subject to any disclaimer, the term of this patent is extended or adjusted under 35 U.S.C. 154(b) by 509 days.

(21) Appl. No.: 17/722,113

(22) Filed: Apr. 15, 2022

(65) Prior Publication Data

US 2022/0334406 A1    Oct. 20, 2022

Related U.S. Application Data

(60) Provisional application No. 63/175,466, filed on Apr. 15, 2021.

(51) Int. Cl.
*G02C 1/06* (2006.01)
*G02C 5/02* (2006.01)

(52) U.S. Cl.
CPC *G02C 1/06* (2013.01); *G02C 5/02* (2013.01)

(58) Field of Classification Search
CPC ........ G02C 1/06; G02C 5/02; G02C 2200/04; G02C 1/10; G02C 5/12; G02C 9/04; G02C 2200/08
See application file for complete search history.

(56) References Cited

U.S. PATENT DOCUMENTS

2020/0033627 A1*    1/2020    Chen ........................ G02C 1/10

* cited by examiner

*Primary Examiner* — James C. Jones
(74) *Attorney, Agent, or Firm* — Kolitch Romano Dascenzo Gates LLC

(57) ABSTRACT

Eyewear of the present disclosure may include a frame having left and right rims, and a central bridge portion coupling the left rim to the right rim. A lens retainer has a first end pivotably coupled to an upper member of the central bridge portion and a second end releasably latched to a lower member of the central bridge portion. A lens is disposed on a front side of the eyewear frame and clamped to the frame by the lens retainer.

20 Claims, 12 Drawing Sheets

EYEWEAR HAVING A PIVOTABLE LENS RETAINER

CROSS-REFERENCES

The following applications and materials are incorporated herein, in their entireties, for all purposes: U.S. Provisional Patent Application Ser. No. 63/175,466, filed Apr. 15, 2021.

FIELD

This disclosure relates to systems and methods for eyewear. More specifically, the disclosed embodiments relate to lens retention features and side shields.

INTRODUCTION

Use of protective eyewear, such as glasses, may result in broken lenses as a result of impacts. Additionally, users of protective eyewear may require multiple pairs of eyewear for different lighting conditions. Lens replacement may be a complicated and/or cumbersome process. Additionally, some protective eyewear may need to be completely replaced if the lenses are broken.

SUMMARY

The present disclosure provides systems, apparatuses, and methods relating to protective eyewear having a pivotable lens retainer system.

In some examples, eyewear of the present disclosure includes: an eyewear frame including a left rim, a right rim, and a central bridge coupling the left rim to the right rim; one or more lenses disposed on front-facing sides of the left and right rims; and a lens retainer having a first end pivotably coupled to the central bridge and a body portion extending from the first end to a distal second end, the second end cooperating with the central bridge to form a releasable latch; wherein the lens retainer is configured to transition between (a) a clamped position, in which the second end is latched to the bridge and the body portion traverses respective front faces of the one or more lenses, and (b) a released position, in which the second end is unlatched and pivoted away from the bridge and the one or more lenses are removable from the frame.

In some examples, eyewear of the present disclosure includes: an eyewear frame including a left rim and a right rim; a central bridge portion coupling the left rim to the right rim; a lens retainer having a first end pivotably coupled to an upper member of the central bridge portion and a second end releasably latched to a lower member of the central bridge portion; a lens disposed on a front side of the eyewear frame and clamped to the frame by the lens retainer.

In some examples, a method for replacing an eyewear lens includes: unlatching a first end of a lens retainer flap from a bridge portion of an eyewear frame, wherein a second end of the lens retainer flap is pivotably coupled to the bridge portion; pivoting the lens retainer flap away from the frame; removing a first lens of the eyewear disposed on a front side of the frame; replacing the first lens with a second lens; and clamping the second lens to the frame by pivoting the lens retainer flap onto the second lens and latching the second end to the bridge portion.

Features, functions, and advantages may be achieved independently in various embodiments of the present disclosure, or may be combined in yet other embodiments, further details of which can be seen with reference to the following description and drawings.

DETAILED DESCRIPTION

Figure 1:
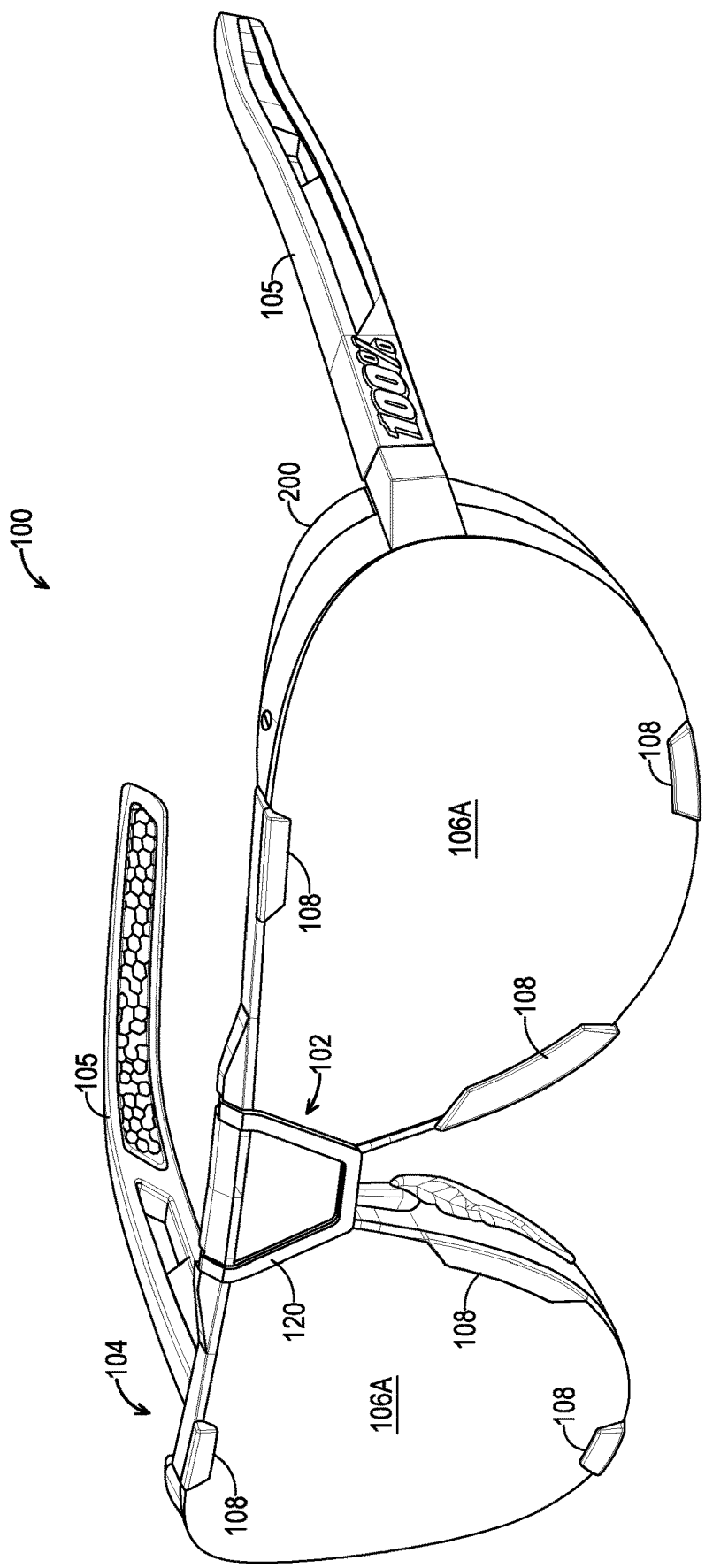
FIG. 1 is an isometric view of illustrative protective eyewear in accordance with aspects of the present disclosure, taken from a front oblique perspective.
Figure 2:
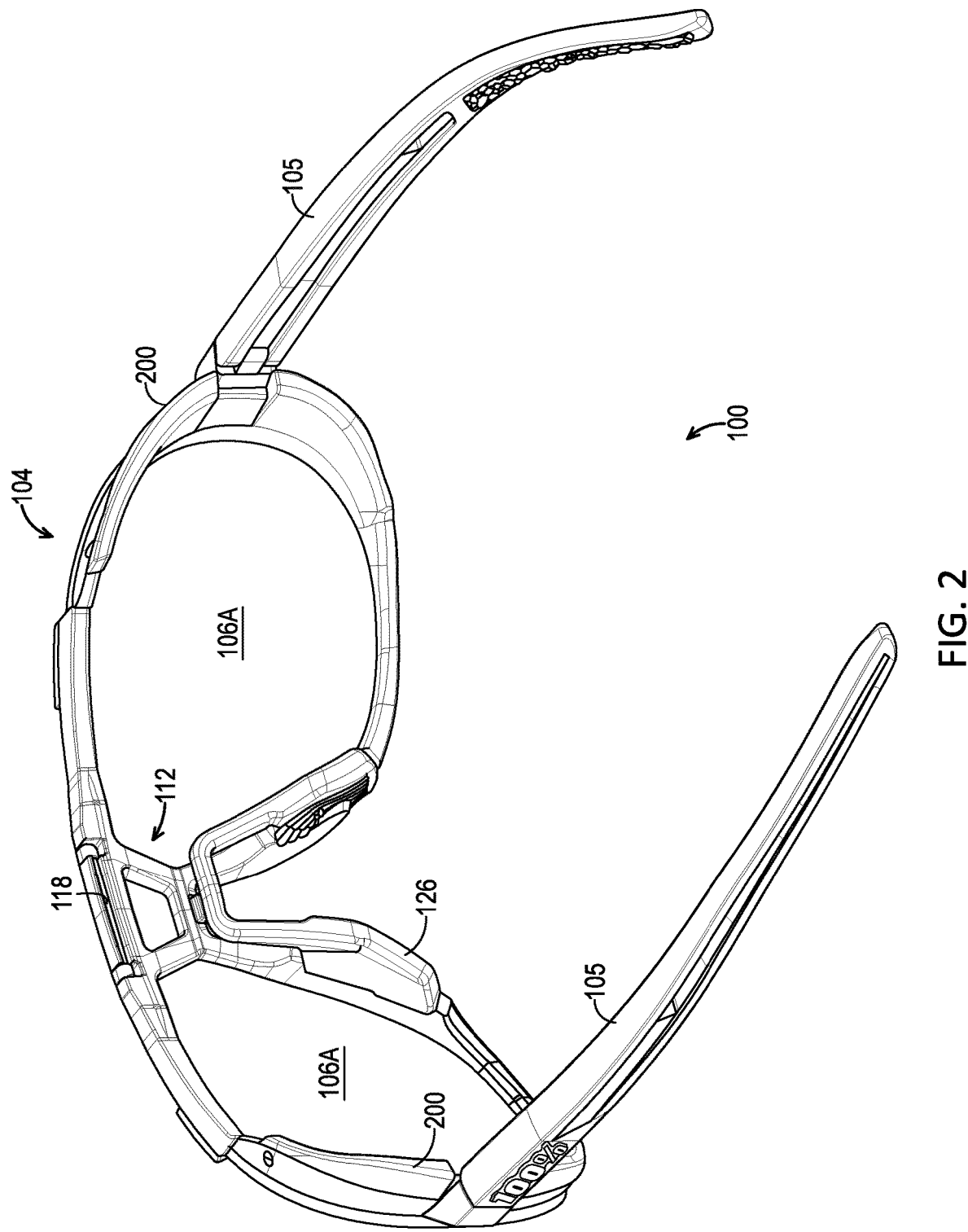
FIG. 2 is an isometric view of the protective eyewear of FIG. 1, taken from a rear oblique perspective.
Figure 3:
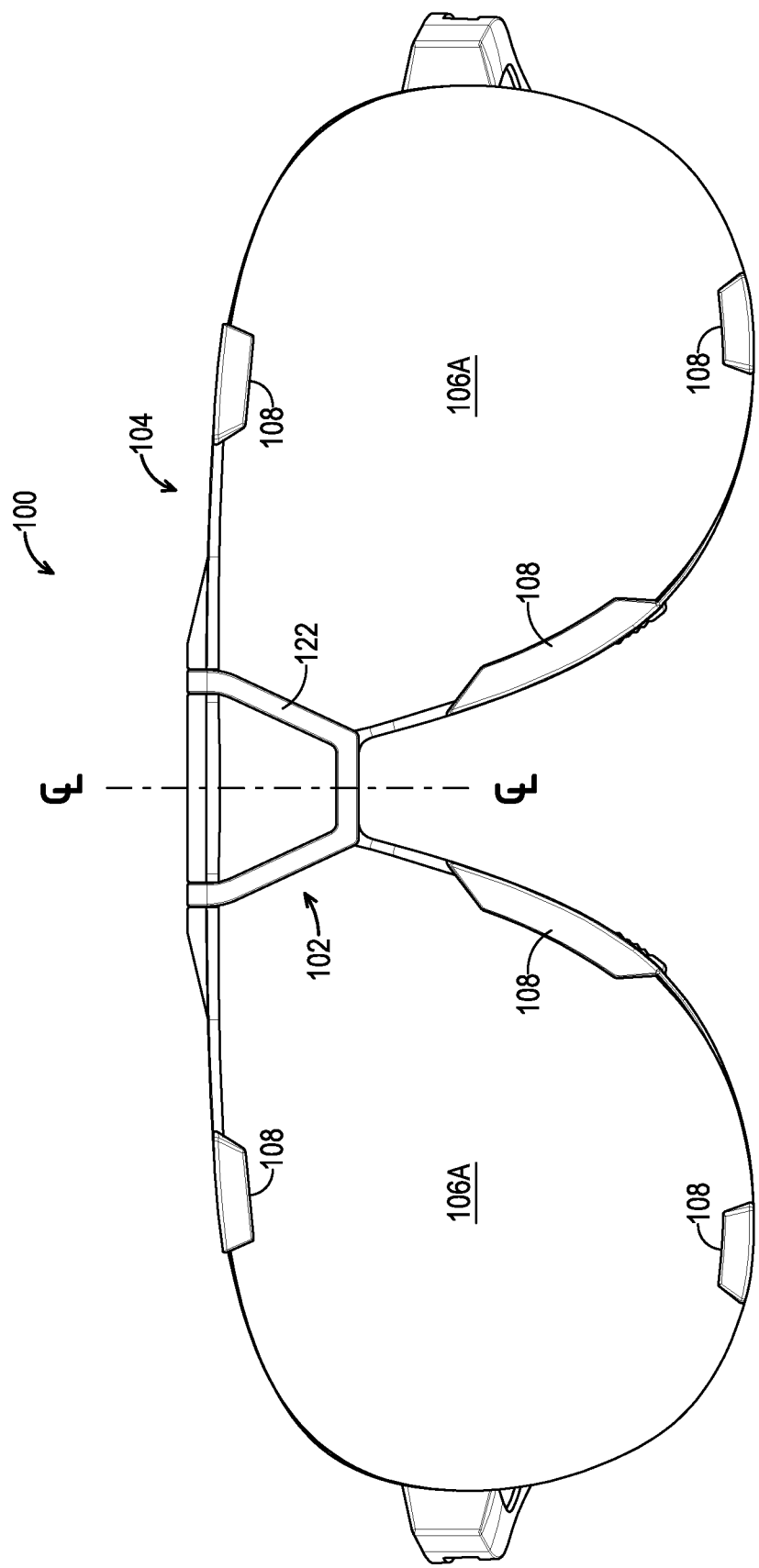
FIG. 3 is a front elevation view of the protective eyewear of FIG. 1.
Figure 4:
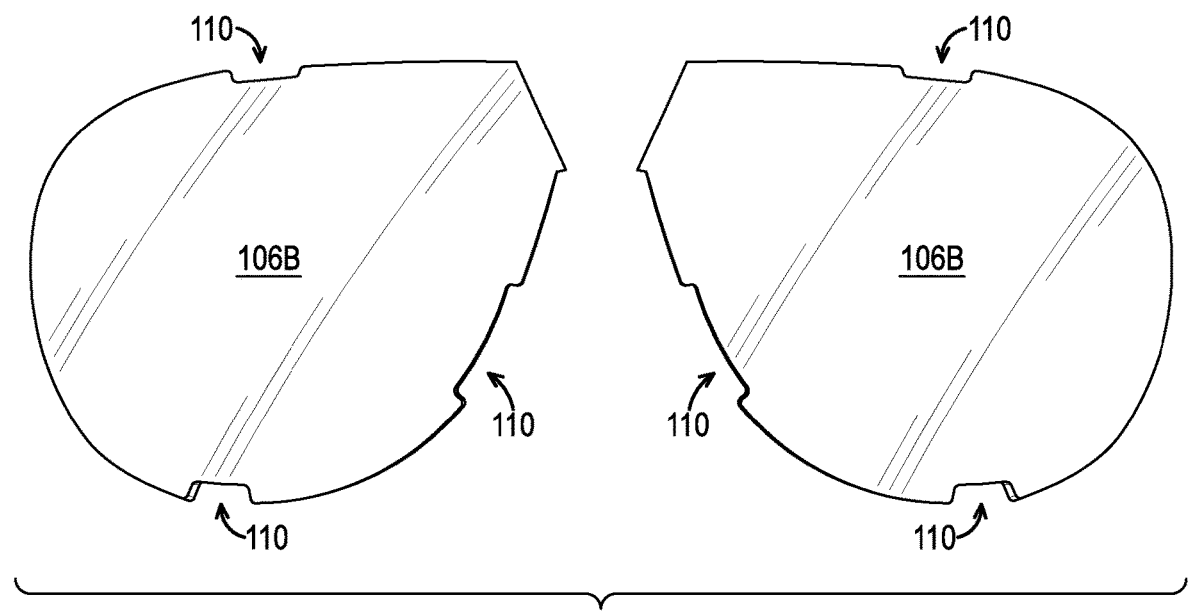
FIG. 4 is a front elevation view of a pair of lenses suitable for use with the protective eyewear of FIG. 1.
Figure 5:
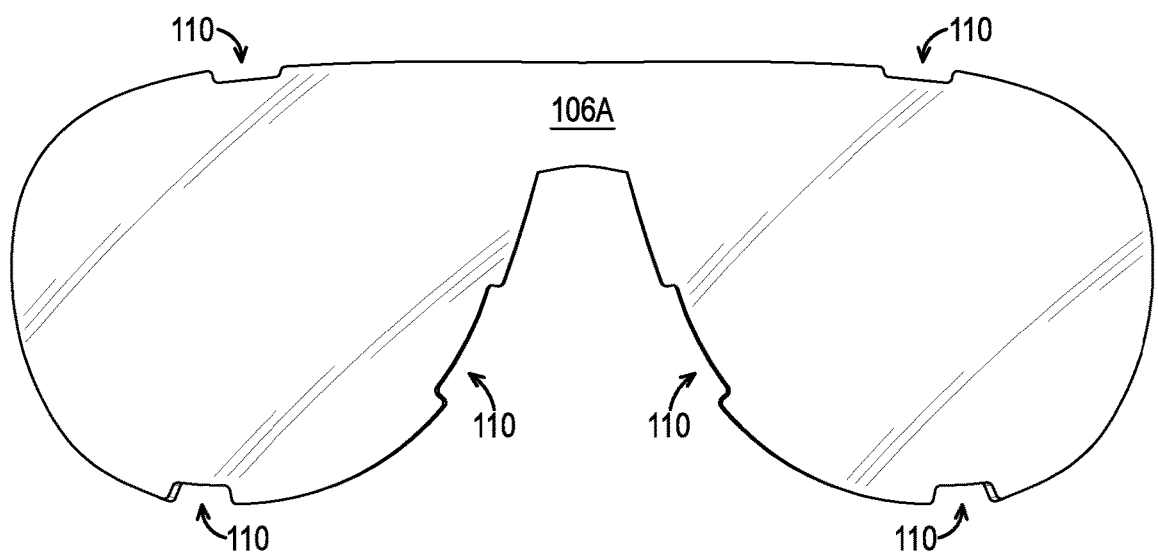
FIG. 5 is a front elevation view of a unitary, shield-type lens suitable for use with the protective eyewear of FIG. 1.

Various aspects and examples of a lens retainer mechanism for eyewear, as well as related methods, are described below and illustrated in the associated drawings. Unless otherwise specified, a pair of glasses in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

"Coupled" means connected, either permanently or releasably, whether directly or indirectly through intervening components.

Anatomy-related terms, such as "medial," "lateral," and the like, are intended to refer to anatomical directions corresponding to a human head or face of a wearer of the eyewear in question. For example, "medial" refers to a relative position disposed toward the center of the human body, while "lateral" refers to a relative position disposed away from the center of the human body. Similarly, terms such as "front" and "rear" of the eyewear should be interpreted in the context of how the eyewear is normally worn, e.g., with the front side facing away from a wearer's face and the rear side facing toward the wearer's face. In the absence of a wearer, the same directional terms may be used as if the eyewear were being worn in its expected configuration.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, eyewear in accordance with the present teachings may include a generally trapezoidal central lens retainer (also referred to as a lens retainer flap) pivotably coupled to a frame of the eyewear, such that the retainer can secure either a shield type lens or individual lenses interchangeably.

In some examples, the retainer defines three sides of a trapezoid, such as a short base and two legs, with a longer base disposed at a hinge joint with the frame, forming a flip-up flap. In some examples, the hinge of the retainer is at the bottom side, forming a flip-down flap. The legs of the trapezoid are configured (in combination with static retention features of the frame) to retain one or more lenses of the eyewear within or against the frame or rim. In the depicted example, the pivotable arms of the retainer are coupled to first and second ends of a long base of the trapezoid. In some examples, the pivotable arms may be curved to wrap around a bridge portion of the frame of the glasses. The lens retainer may comprise any suitable material having sufficient structural stiffness, such as metal, polymer, plastics, and/or the like.

The free end of the lens retainer includes a tab, hook, or flange protruding rearward, to include a latching feature such that the tab is configured to snap into a corresponding aperture and/or to mate with a corresponding protrusion or recess of the eyewear frame. In some examples, the tab is oriented transverse to the lens retainer. In some examples, the tab is oriented at a 75-90° angle with respect to the lens retainer. In some examples, the tab may have a stepped thickness in at least one dimension, wherein a first (e.g., distal) portion of the tab has a larger thickness in at least one dimension than a second (e.g., proximal) portion of the tab. This stepped configuration helps to secure the tab in the latching mechanism.

Eyewear of the present teachings includes a frame or rim having at least one flanged protrusion at a periphery, configured to contact at least a portion of the edge and/or front of the lens. In some examples, the frame is configured to receive interchangeably either a unitary (shield type) lens which covers both eyes of a user or a pair of lenses which each cover only a single respective eye of the user.

The eyewear frame may include any material(s) suitable for eyewear frames, such as metal, polymer, rubber, plastics, wood, and/or the like. The lens(es) may comprise any material suitable for eyewear lenses, such as glass, plexiglass, transparent polymers, and/or the like. The lens(es) may be tinted, non-tinted, transition lenses, and/or have any suitable property configured to provide desired protection, appearance, and/or vision enhancement. In some examples, the glasses are configured to allow a user to easily switch between lenses having different properties, such as between clear glasses and sunglasses, and/or to easily switch between a unitary shield-type lens and a dual lens configuration.

The rim or frame includes a bridge portion which is configured to extend across a nose and brow of the user when the eyewear is worn. In some examples, the bridge is generally trapezoidal, and includes four sides which collectively define a central aperture. The top or brow bar of the bridge defines a rear channel or depression, which is configured to receive an upper horizontal pivot pin of the lens retainer hinge. In some examples, the rear channel is disposed within a long edge of the trapezoidal bridge portion. In some examples, the arms of the lens retainer are coupled to a pin or axle that is received by the rear channel, forming a hinge joint. In some examples, the arms are received in a ball-and-socket joint. The retainer and the rear channel interface such that the lens retainer is pivotable about an axis defined by the rear channel.

The bridge portion of the frame includes a latching feature configured to releasably receive the tab that extends from the free end of the retainer. This aperture or contour may be disposed at the lower end of the bridge portion of the frame. In some examples, an aperture is disposed within a short base of the trapezoidal bridge portion. In some examples, a ridge or other retaining feature may be present on a lower surface of the bridge. In either case, the tab and latching feature is configured such that the retainer snaps securely into place. In some examples, the aperture or contour is slightly offset from the natural end position of the tab when the tab is pivoted toward the aperture, such that a user applies force to urge the tab into and out of a latching position.

The lens retainer is pivotable between a secured or clamped configuration and an unsecured or released configuration. When the lens retainer is in the clamped configuration, the tab of the lens retainer is latched to the bridge portion. The trapezoidal body of the lens retainer is generally parallel to a surface of the eyewear frame. The legs of the trapezoidal retainer directly contact a front surface of the lens or lenses, such that the lens or lenses are sandwiched between the frame and the body of the retainer.

When the lens retainer is in the released configuration, the lens retainer is oriented at a transverse angle with respect to the frame. The lens retainer remains pivotably coupled to the frame at the hinge joint. The lens retainer does not directly contact the lens in the unsecured configuration. Accordingly, the lens may be freely removed from the rim and replaced. A user may wish to replace a single lens of a pair of lenses. When the lens retainer is in the unsecured configuration, the lens(es) may remain secured or partially secured by the rim and/or the rim extension(s).

In some examples, a tab displacement tool may be utilized to assist a user in transitioning the lens retainer between the secured configuration and the unsecured configuration. In these examples, the tool may be utilized to depress the tab such that the lens retainer can be released from the aperture. In some examples, the tab displacement tool includes a protruding finger coupled to an elongate base. Utilizing the tab displacement tool to release a lens retainer may include sliding the tab displacement tool under the bridge portion of the pair of glasses, and applying pressure to the tab of the lens retainer using the protruding finger.

A method for replacing a lens includes depressing a tab of a lens retainer, pivoting the retainer flap away from the lens, replacing the lens, pivoting the retainer flap down (or up) to secure the replacement lens, and snapping the tab into a latching feature of the eyewear frame to secure the retainer in place.

EXAMPLES, COMPONENTS, AND ALTERNATIVES

The following sections describe selected aspects of illustrative eyewear having lens retainer systems and/or side shields, as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Eyewear

As shown in FIGS. 1-13, this section describes an illustrative pair of glasses 100 (AKA eyewear or article of eyewear) having a pivotable lens retainer 102 as described above. Eyewear 100 includes a frame 104, and a pair of temples 105 are pivotably coupled to frame 104 at lateral sides. Frame 104 is configured to receive one or more lenses, i.e., a shield-type lens 106A or single-eye lenses 106B. Lens(es) 106A, 106B may have any suitable shape and size, such as ovular, rectangular, kidney-shaped, oblong, and/or the like. Accordingly, at least portions of frame 104 may have a corresponding shape for receiving such a lens. Frame 104 includes one or more peripheral protrusions 108, which extend from a front surface of the frame. Each peripheral protrusion includes a base portion configured to engage a cutout 110 of lens 106A or 106B and a distal flange configured to engage the front face of the lens.

Lens(s) 106A, 106B may include any material suitable for eyewear lenses, such as glass, plexiglass, transparent polymers, and/or the like. Lenses may be tinted, non-tinted, transition lenses, and/or have any suitable property configured to enhance a user's vision. In some examples, eyewear 100 is configured to allow a user to easily switch between lenses having different properties, such as between non-tinted glasses and sunglasses. In some examples, eyewear 100 is configured to allow a user to easily switch between a shield-type lens and a dual lens configuration (see FIGS. 4-5).

Frame 104 includes a bridge portion 112 which extends between the eyes (e.g., across a nose and brow) of the user when worn. In the example depicted in FIG. 9, bridge portion 112 is trapezoidal, and includes four legs which define a central vent or aperture 114. Trapezoidal bridge portion 112 includes a rear-facing channel 116 disposed at an upper rear surface of the frame. Channel 116 is an elongate channel configured to receive a hinge pin 118 (see FIGS. 9-12). In some examples, channel 116 includes a protruding ridge disposed on one or both long sides of the channel, which secures hinge pin 118 of lens retainer 102 within the channel.

Lens retainer 102 is pivotably coupled to frame 104 by pin 118, which is received within channel 116. Pin 118 and channel 116 collectively form a hinge joint, which allows lens retainer 102 to pivot about an axis defined by the pin. Pin 118 is coupled at each end to legs 120, the pair of which extend forward from the pin and then downward toward a distal end. In some examples, legs 120 may be curved or angled to better wrap around a top edge of the eyewear frame.

Pin 118 forms a long base of a substantially trapezoidal body of lens retainer 102. The two legs 120 of the retention body collectively secure lens(es) 106A, 106B to the frame (e.g., to front surfaces of the frame). When the retainer is in a clamped configuration, the lens(es) are sandwiched between retainer 102 and bridge portion 112 of frame 104.

A tab or hook 122 extends at a transverse angle from a rear side of the distal end of retainer 102. The hook is configured to be received by a latching feature 124 (e.g., a ridge or aperture) of bridge portion 112 of the eyewear frame. In some examples, the hook may have a stepped thickness in at least one dimension, wherein a distal portion of the hook is enlarged in at least one dimension as compared with a proximal portion of the hook (see, e.g., FIG. 10). This stepped configuration helps secure the hook to the latching feature. The user must then apply a directional force to the hook to displace the hook from the latch.

Lens retainer 102 is pivotable between a clamped configuration and a released configuration. Applying force to hook 122 when the hook is engaged by latching feature 124 releases the hook, facilitating pivotable movement of the hook about the axis defined by pin 118. When lens retainer 102 is secured to frame 104, lens 106A/106B is held in place by the retainer. When lens retainer 102 is released and able to pivot freely, lens 106A/106B is held in place only by peripheral protrusions 108, and may easily be removed by the user.

Figure 6:
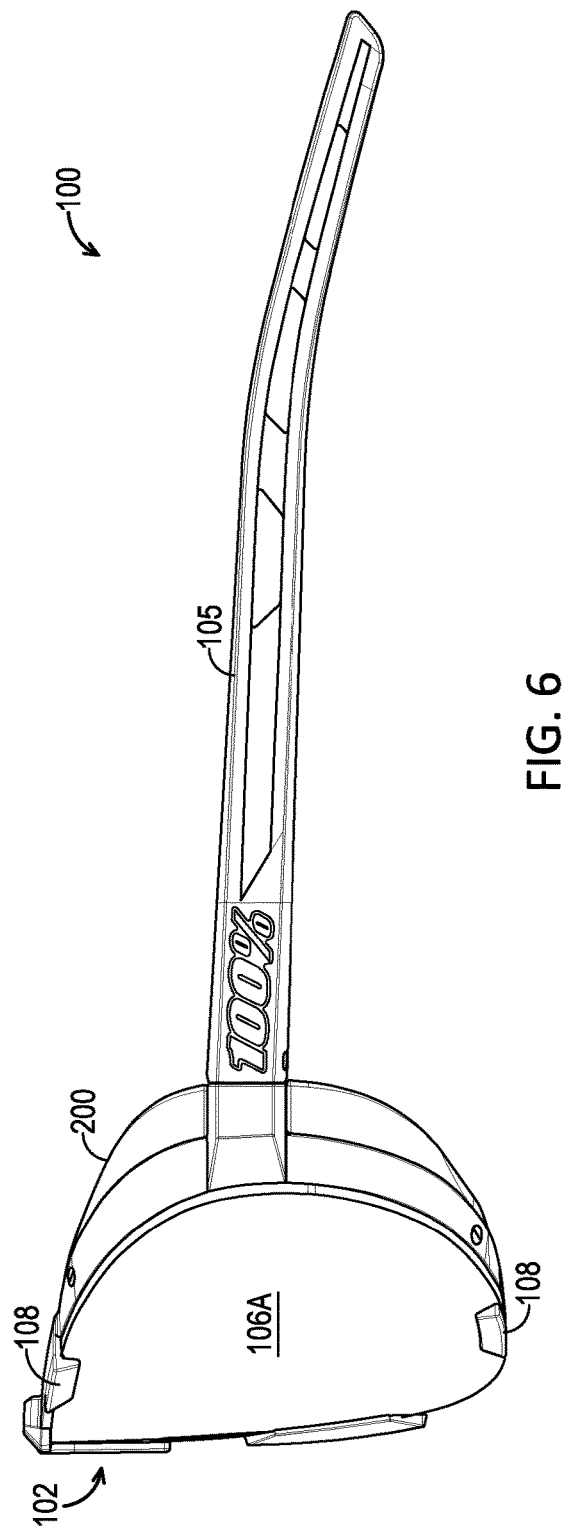
FIG. 6 is a side elevation view of the protective eyewear of FIG. 1, with a lens retainer mechanism in a first position.
Figure 7:
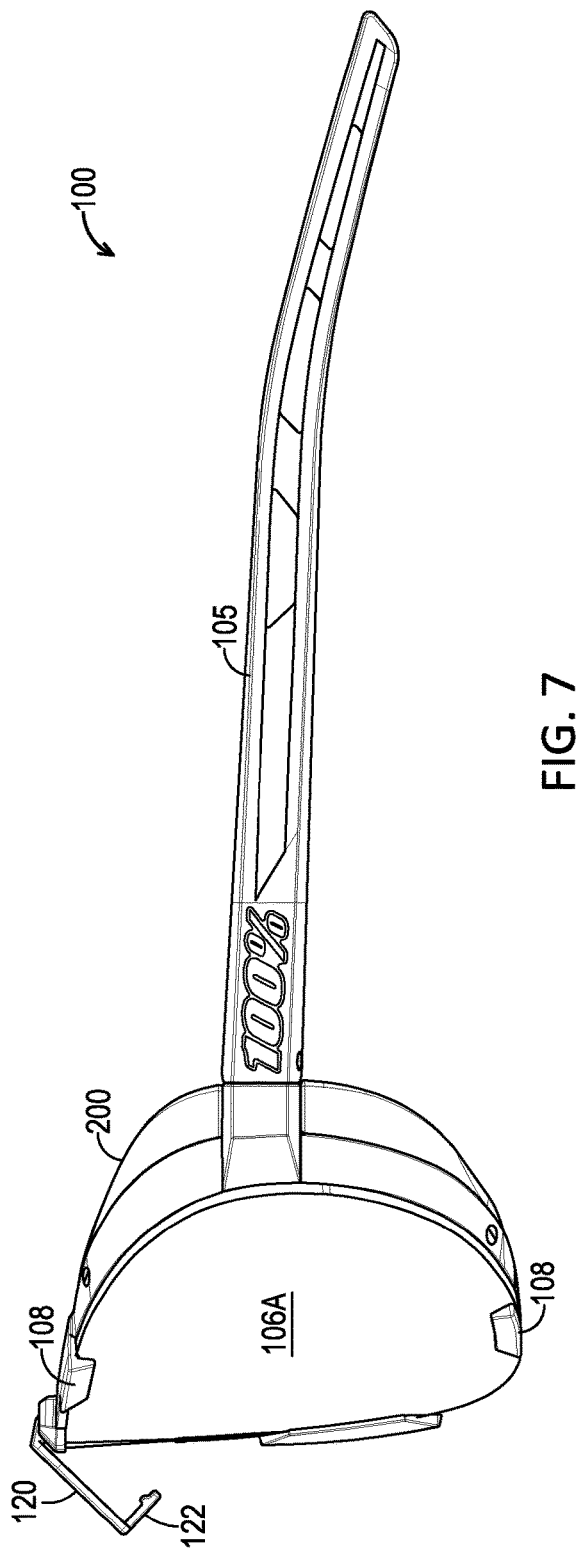
FIG. 7 is a side elevation view of the protective eyewear of FIG. 1, with the lens retainer mechanism in a second position.
Figure 8:
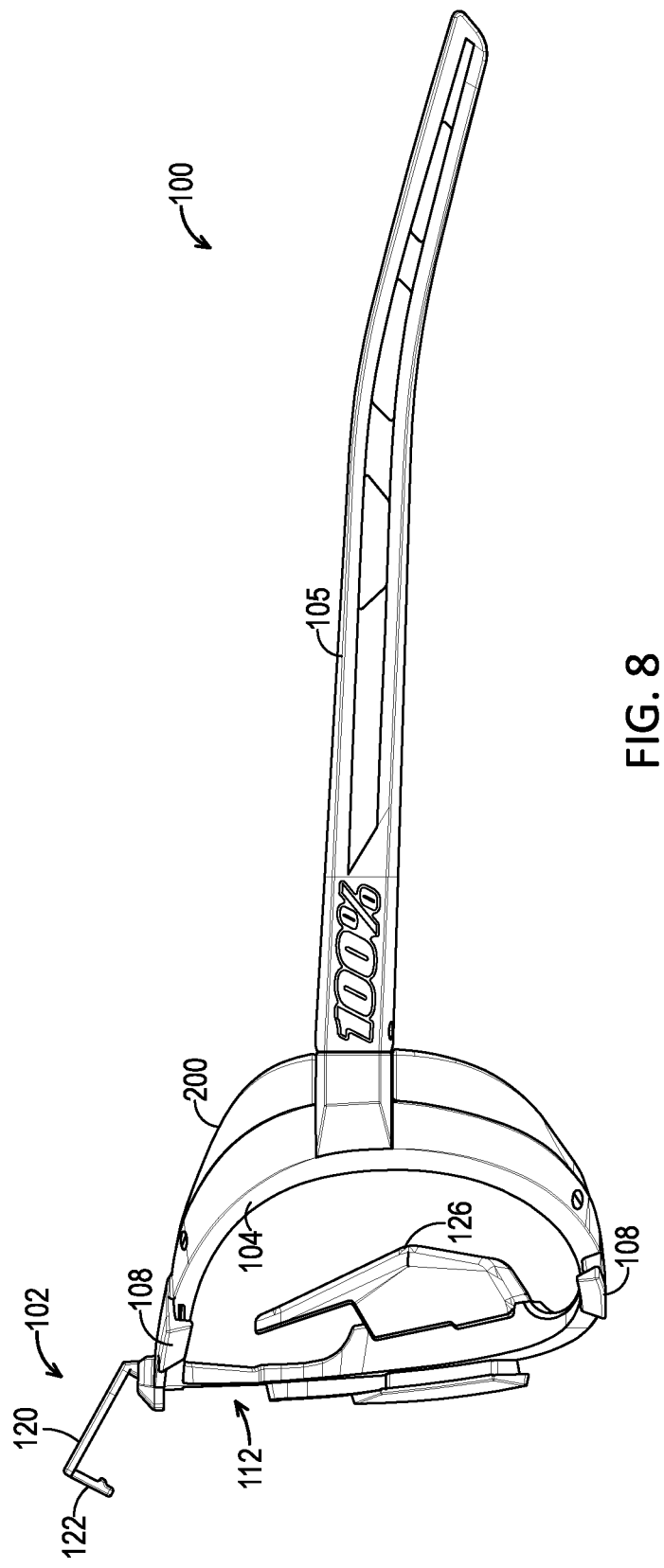
FIG. 8 is a side elevation view of the protective eyewear of FIG. 1, with the lens removed from the frame.

Turning to FIGS. 6-8, eyewear 100 is shown in three positions. FIG. 6 depicts eyewear 100 in an operational mode, with lens 106A/106B secured to frame 104 by lens retainer 102. In FIG. 7, hook 122 has been unlatched and legs 120 of lens retainer 102 are pivoted away from the front face of the lens. Although the examples depicted herein show a flip-up lens retainer, the lens retainer may in some examples be oriented differently, such as having the pivot axis at a lower end and resulting in a flip-up flap. In FIG. 8, lens retainer 102 is further pivoted out of the way of the lens, and the lens is removed from frame 104.

Figure 9:
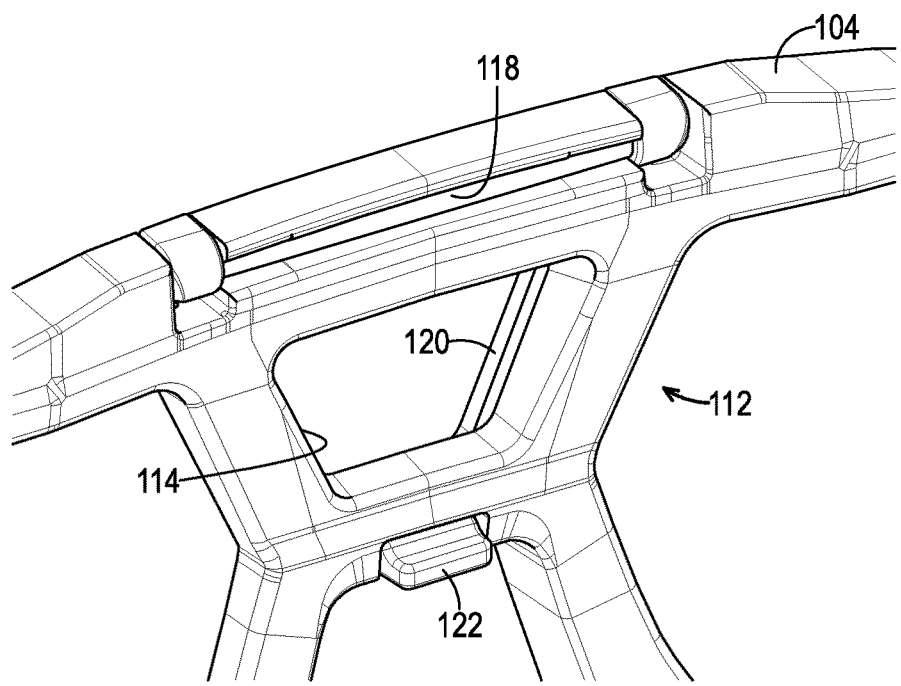
FIG. 9 is a magnified view of a nose bridge portion of the protective eyewear of FIG. 1, taken from a rear oblique perspective.
Figure 10:
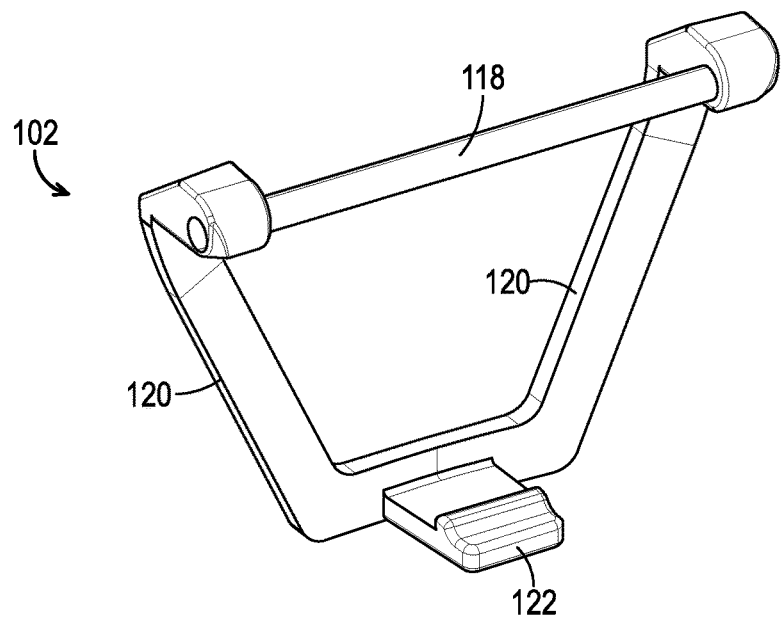
FIG. 10 is an illustrative lens retainer flap of the nose bridge portion of FIG. 9, shown in isolation.
Figure 11:
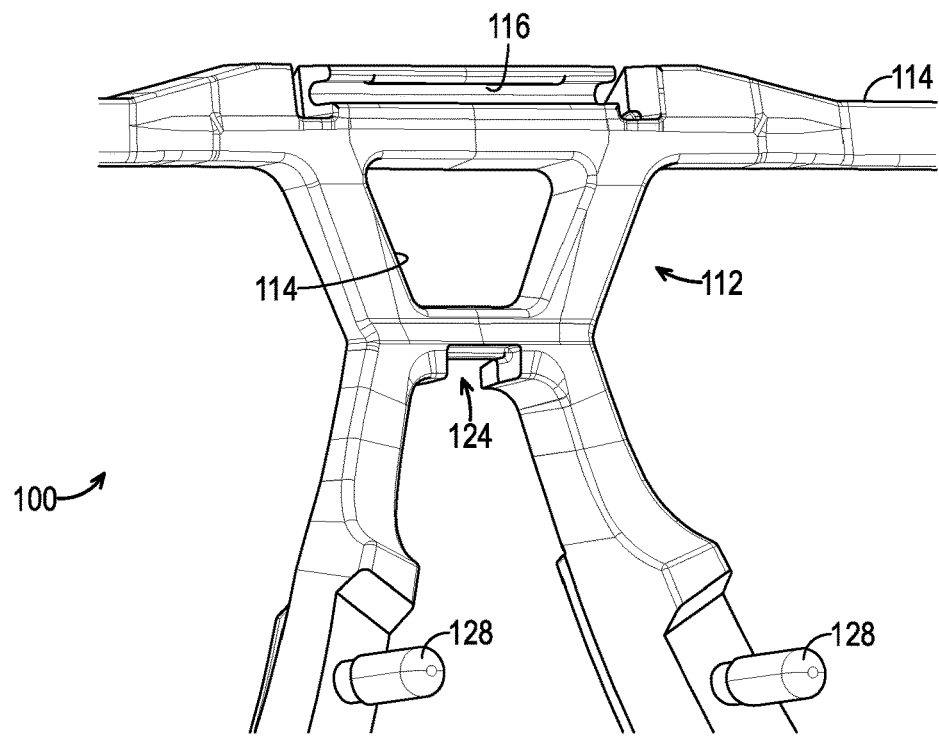
FIG. 11 is an isometric view of the nose bridge portion of FIG. 9, with the lens retainer flap removed.
Figure 12:
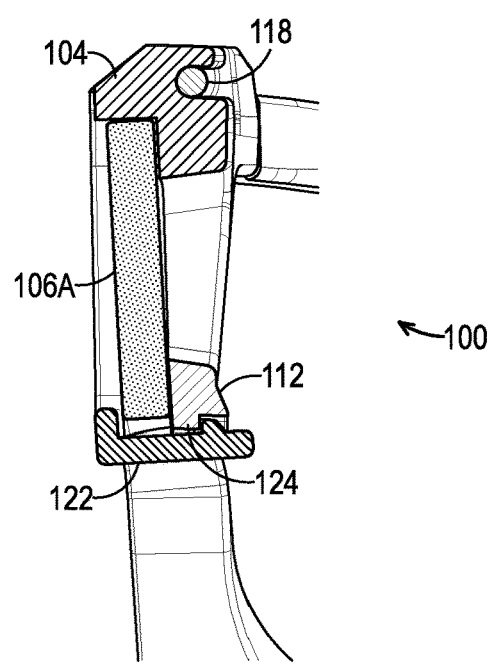
FIG. 12 is a sectional side elevation view of the nose bridge portion of FIG. 9, with the lens retainer flap depicted retaining the lens, taken at the centerline indicated in FIG. 3.

FIGS. 9-12 are various views depicting bridge portion 112 of frame 104 and how lens retainer 102 interfaces and interacts with the bridge portion. FIG. 9 shows hook 122 engaged with the latching feature of bridge portion 112. FIG. 10 depicts lens retainer 102 in isolation, in an orientation similar to that of FIG. 9 to enhance understanding. FIG. 11 depicts bridge portion 112 from a lower perspective, with the lens retainer removed to show underlying components. FIG. 12 is a side view of a cross section of the lens retainer in the clamped position, showing interaction among the various features.

Figure 13:
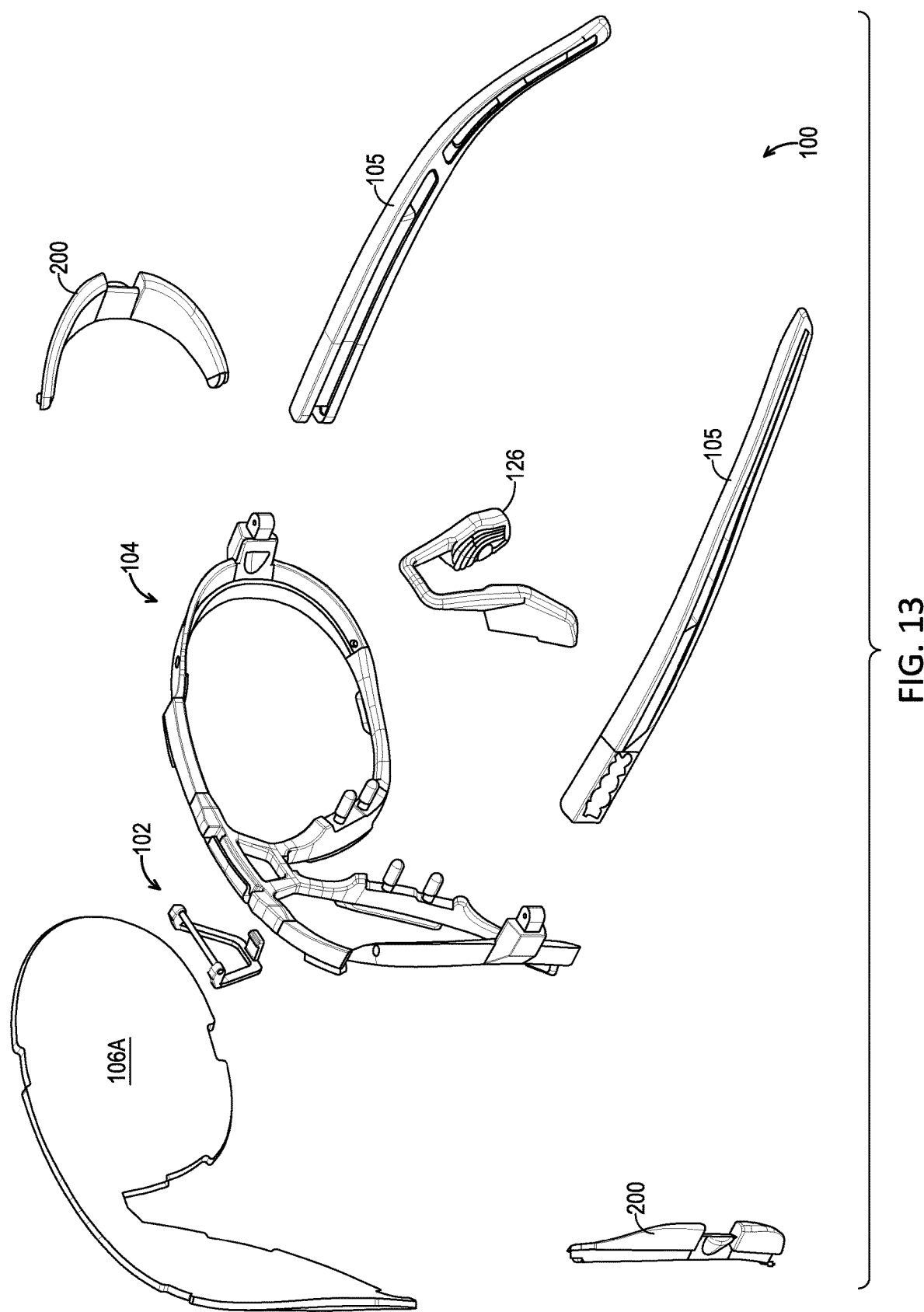
FIG. 13 is an isometric exploded view of the eyewear of FIG. 1, taken from a rear oblique perspective.

FIG. 13 is an exploded view of eyewear 100, depicting lens 106A, lens retainer 102, frame 104, and temples 105. A pair of side shields 200, further described below, are also shown, as is a nose pad 126 configured to be removably installed on pegs 128 of frame 104.

B. Illustrative Removable Side Shields

Figure 14:
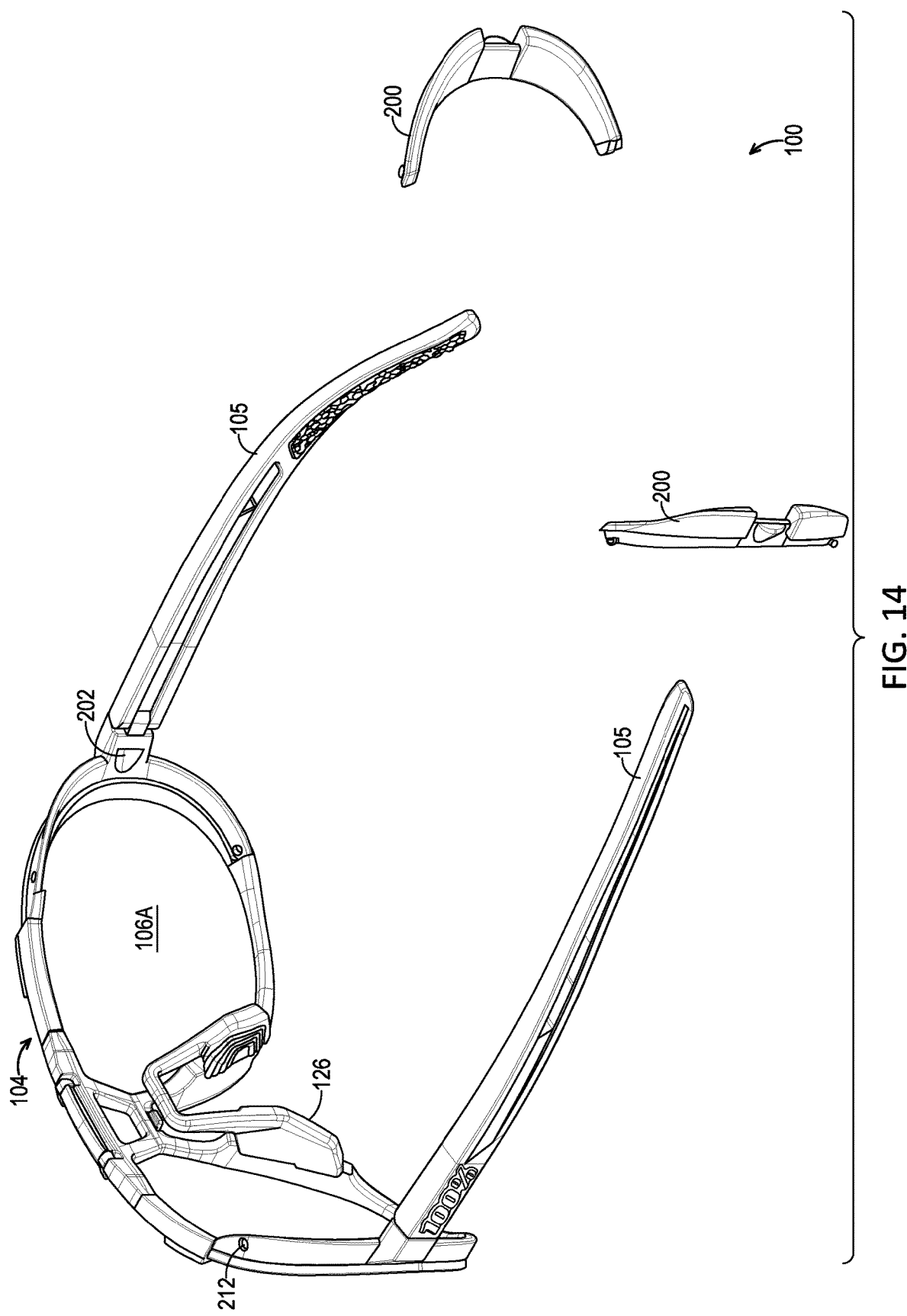
FIG. 14 is a partially exploded view of the eyewear of FIG. 1, showing side shields removed from a frame of the eyewear.
Figure 15:
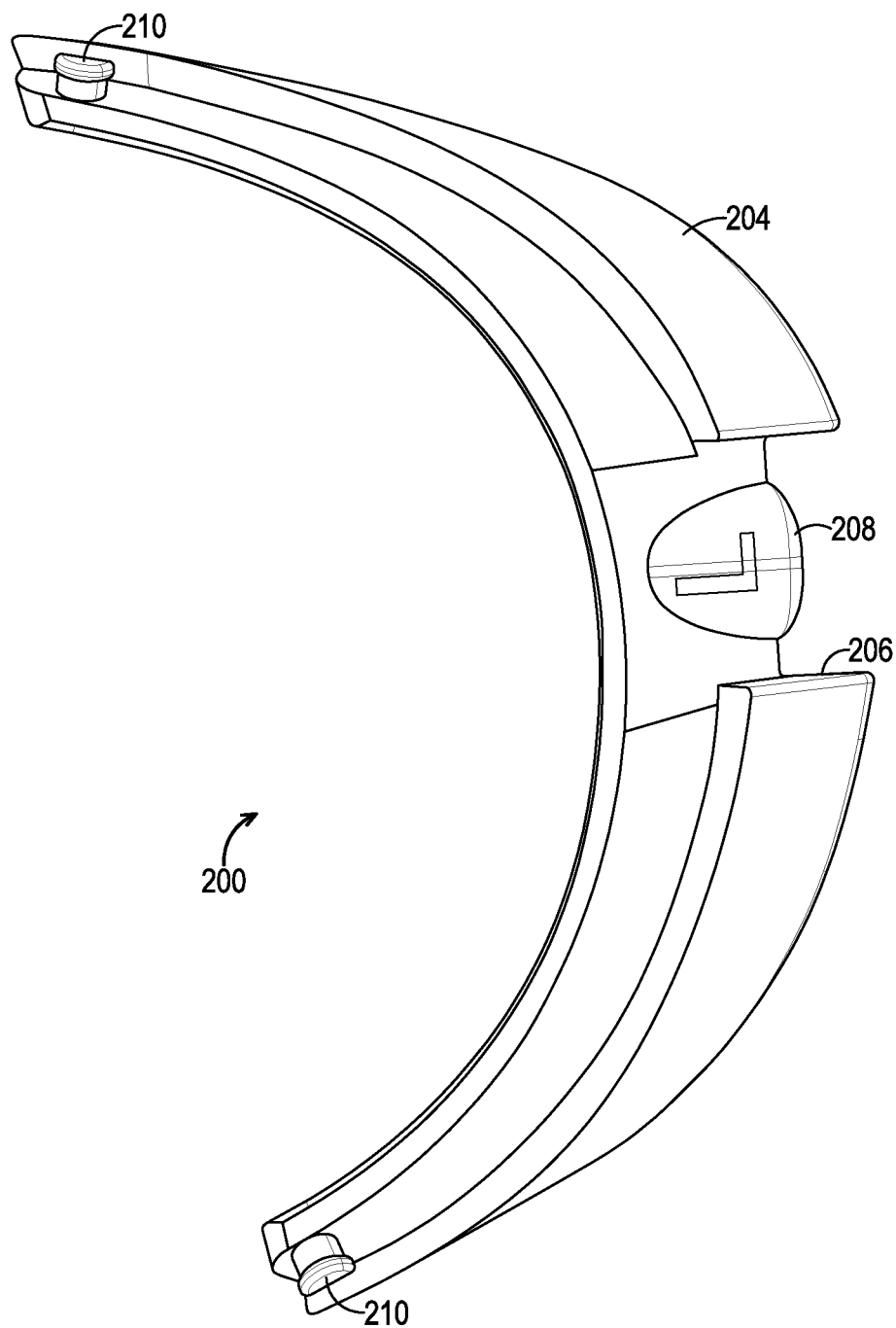
FIG. 15 is an isometric view of an illustrative side shield suitable for use with the eyewear of FIG. 1.

This section further describes the pair of removable side shields 200 releasably coupled to a frame 104 of eyewear 100 (see FIGS. 14-15). Each of removable side shields 200 extend lateral sides of the frame in a rearward direction, and protect the eyes and face of a user from debris and/or glare.

As depicted in FIG. 14, eyewear 100 includes frame 104 and one or more lens(es) 106A/106B clamped to frame 104. A pair of temples 105 is pivotably coupled to frame 104 at lateral sides of the frame. Each removable side shield 200 is releasably coupled to each lateral end of frame 104 at a rear side of the frame. Frame 104 includes a peripheral recess 202 disposed on a rear side of each lateral end of the frame, which may receive removable side shield 200 in a flush fit.

Removable side shield 200 includes a curved piece of rigid and/or resilient material configured to extend a side portion of frame 104 in a rearward direction. Accordingly, the curvature of removable side shield 200 follows a shape of the lateral side of frame 104. Removable side shield 200 may have any suitable profile or shape, such as semi-circular, semi-ovular, semi-stadium-shaped, and/or the like. Removable side shield 200 may include a rim 204 extending from an outboard surface of the side shield, which forms a continuous surface with an outer surface of frame 104 when installed. Rim 204 includes a notch or discontinuity 206 (AKA a gap), which is configured to accommodate temples 105 when the temples are pivoted or folded inward. In the depicted example of FIG. 15, removable side shield 200 includes a truncated cylindrical protrusion 208 which is configured to be received by complementary recess 202 disposed at a junction between frame 104 and temples 105.

Removable side shield 200 is coupled to glasses frame 104 by a plurality of attachment pins 210 extending from side shield 200. Glasses frame 104 includes a plurality of attachment holes 212 which are configured to receive and retain the attachment pins. In some examples, removable side shield 200 includes two spaced apart attachment pins 210. In some examples, attachment pins 210 may be mushroom-shaped (e.g., may have balls, discs, or other features disposed at distal ends), and may require a user to apply force to the side shield to insert or remove the pins from corresponding attachment holes (i.e., in a snap-fit). In some examples, attachment pins are on frame 104 and holes 212 are on side shield 200.

Further description and illustrative combinations of features are outlined below as alphanumerically designated paragraphs.

A0. Eyewear, comprising:
an eyewear frame including a left rim, a right rim, and a central bridge coupling the left rim to the right rim;
one or more lenses disposed on front-facing sides of the left and right rims; and
a lens retainer having a first end pivotably coupled to the central bridge and a body portion extending from the first end to a distal second end, the second end cooperating with the central bridge to form a releasable latch;
wherein the lens retainer is configured to transition between (a) a clamped position, in which the second end is latched to the bridge and the body portion traverses respective front faces of the one or more lenses, and (b) a released position, in which the second end is unlatched and pivoted away from the bridge and the one or more lenses are removable from the frame.

A1. The eyewear of A0, wherein the lens retainer is pivotably coupled to the central bridge by a hinge joint, e.g., disposed at an upper portion of the bridge.

A2. The eyewear of A1, wherein the body portion of the lens retainer comprises two members, each of the two members extending from a respective lateral end of the hinge joint to the distal second end of the lens retainer, such that a space is formed between the two members.

A3. The eyewear of any one of paragraphs A0 through A2, wherein the distal second end of the lens retainer comprises a hook.

A4. The eyewear of A3, wherein a lower portion of the bridge comprises an interface configured to mate with the hook of the lens retainer.

A5. The eyewear of any one of paragraphs A0 through A4, wherein the one or more lenses comprise only a single shield-style lens engaging the left rim and the right rim.

A6. The eyewear of A5, wherein the lens retainer comprises an aperture, and the single lens fills the aperture when the lens retainer is in the clamped position.

A7. The eyewear of any one of paragraphs A0 through A6, wherein the one or more lenses comprise independent left and right lenses.

A8. The eyewear of any one of paragraphs A0 through A7, wherein the one or more lenses comprise a plurality of peripheral cutouts configured to mate with corresponding peripheral protrusions of the left and right rims.

A9. The eyewear of A8, wherein each of the peripheral protrusions of the left and right rims comprises a base portion configured to engage one of the cutouts and a distal flange configured to engage the front face of the lens.

B0. Eyewear, comprising:
an eyewear frame including a left rim and a right rim;
a central bridge portion coupling the left rim to the right rim;
a lens retainer having a first end pivotably coupled to an upper member of the central bridge portion and a second end releasably latched to a lower member of the central bridge portion;
a lens disposed on a front side of the eyewear frame and clamped to the frame by the lens retainer.

B1. The eyewear of B0, wherein the lens retainer is pivotably coupled to the upper member of the bridge portion by a hinge, and the lens retainer comprises a trapezoidal flap having a base formed by the hinge.

B2. The eyewear of B1, wherein the lens retainer comprises a pair of legs extending from respective ends of the hinge, such that at least one of the legs is disposed across a front face of the lens.

B3. The eyewear of B2, wherein an aperture is defined between the legs of the lens retainer.

B4. The eyewear of any one of paragraphs B0 through B3, wherein the lens is a unitary lens engaging both the left rim and the right rim.

B5. The eyewear of any one of paragraphs B0 through B4, wherein the lens retainer is configured to unclamp the lens by unlatching the second end and pivoting the second end away from the frame.

B6. The eyewear of any one of paragraphs B0 through B5, wherein the lens comprises one or more peripheral cutouts.

B7. The eyewear of B6, wherein the frame comprises one or more flanged protrusions configured to mate with the one or more peripheral cutouts.

B. Illustrative Method

Figure 16:
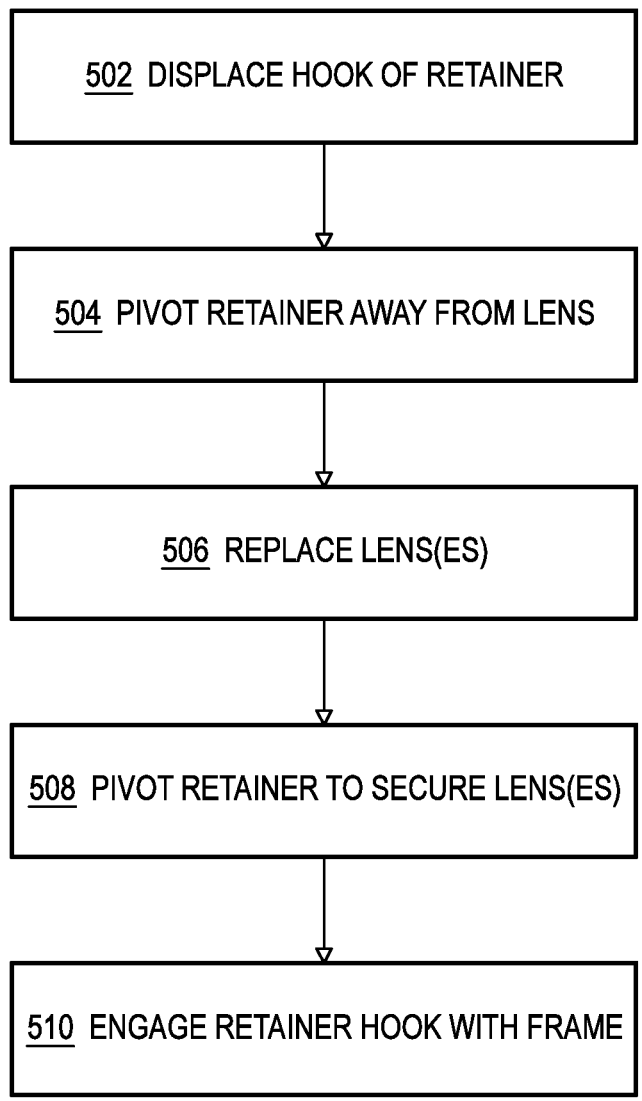
FIG. 16 is a flowchart depicting steps of an illustrative method for retaining and replacing lenses of protective eyewear, such as the eyewear of FIG. 1.

This section describes steps of an illustrative method 500 for replacing an eyewear lens; see FIG. 16. Aspects of glasses 100 may be utilized in the method steps described below. Where appropriate, reference may be made to components and systems that may be used in carrying out each step. These references are for illustration, and are not intended to limit the possible ways of carrying out any particular step of the method.

FIG. 16 is a flowchart illustrating steps performed in an illustrative method, and may not recite the complete process or all steps of the method. Although various steps of method 500 are described below and depicted in FIG. 16, the steps need not necessarily all be performed, and in some cases may be performed simultaneously or in a different order than the order shown.

Step 502 of method 500 includes depressing a tab or hook of a lens retainer. Depressing the tab of the lens retainer dislodges or displaces the flap from a receiving aperture or latching feature of a glasses frame. Accordingly, depressing the tab or hook of the lens retainer transitions the flap of the retainer body from a secured configuration to an unsecured configuration, and facilitates free pivoting of the retainer. In some examples, step 502 includes applying pressure to the tab of the lens retainer utilizing a tab displacement tool. In some examples, step 502 includes applying pressure to the tab of the lens retainer utilizing a finger of the user. In some examples, depressing the tab of the lens retainer includes applying pressure to the tab at an angle, such that the tab can be dislodged from a biased or wedged position with respect to the aperture in which the tab is received.

Step 504 of method 500 includes pivoting the retainer away from the lens. Pivoting the retainer away from the lens may include pivoting the retainer about an axis defined by a retention channel disposed within a glasses frame. In some examples, pivoting the retainer away from the lens includes pivoting the retainer greater than 90 degrees (e.g., up to 180°) away from an orientation of the retainer when the retainer is in the secured configuration.

Step 506 of method 500 includes removing, installing, and/or replacing the lens(es). In some examples, replacing the lens includes sliding a first lens or lenses out from beneath a rim extension included in the glasses frame. In some examples, replacing the lens includes sliding a second lens or lenses into or beneath the rim extension. In some examples, replacing the lens includes replacing a unitary lens which is configured to cover both eyes of a wearer with a pair of discrete lenses, each of which is configured to cover a single eye of a wearer. In some examples, replacing the lens includes replacing a pair of discrete lenses, each of which is configured to cover a single eye of a wearer with a unitary lens which is configured to cover both eyes of a wearer. In some examples, replacing the lens includes replacing a substantially clear and non-tinted lens(es) with a tinted lens(es), such as a suitable lens for sunglasses. The lens(es) may comprise any suitable material for eyewear lenses, such as glass, plexiglass, transparent polymers, and/or the like. Accordingly, replacing the lens(es) may include replacing a lens comprising any suitable material for eyewear lenses with a lens comprising any other suitable material for eyewear lenses.

Step 508 of method 500 includes pivoting the retainer such that the retainer secures the lens. Pivoting the retainer such that the retainer secures the lens may include pivoting the retainer about an axis defined by a retention channel disposed within the glasses frame. In some examples, pivoting the retainer away from the lens includes pivoting the retainer such that the retainer directly contacts an outer surface of the lens(es).

Step 510 of method 500 includes engaging the tab or hook with the aperture or other latching feature of the eyewear frame. In some examples, this step includes applying pressure such that the tab or hook snaps into place.

Further description and illustrative combinations of features are outlined below as alphanumerically designated paragraphs.

C0. A method for replacing an eyewear lens, the method comprising:
  unlatching a first end of a lens retainer flap from a bridge portion of an eyewear frame, wherein a second end of the lens retainer flap is pivotably coupled to the bridge portion;
  pivoting the lens retainer flap away from the frame;
  removing a first lens of the eyewear disposed on a front side of the frame;
  replacing the first lens with a second lens; and
  clamping the second lens to the frame by pivoting the lens retainer flap onto the second lens and latching the second end to the bridge portion.

C1. The method of C0, wherein the second lens is a unitary lens configured to cover left and right eyes of a wearer.

Advantages, Features, and Benefits

The different embodiments and examples of the protective eyewear described herein provide several advantages over known solutions for changing lenses for eyewear. For example, illustrative embodiments and examples described herein allow a user to easily swap out the lenses of an article of protective eyewear.

Additionally, and among other benefits, illustrative embodiments and examples described herein allow a user to replace a single shield-type lens in a pair of protective glasses with two individual lenses (and vice versa).

Additionally, and among other benefits, illustrative embodiments and examples described herein have a lens retainer that conforms to and covers the edges of discrete lenses, while also functioning to secure shield-type lenses.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. Eyewear, comprising:
an eyewear frame including a left rim, a right rim, and a central bridge coupling the left rim to the right rim;
one or more lenses disposed on front-facing sides of the left and right rims; and
a lens retainer having a first end pivotably coupled to the central bridge and a body portion extending from the first end to a distal second end, the second end cooperating with the central bridge to form a releasable latch, wherein the distal second end of the lens retainer comprises a hook, wherein a lower portion of the bridge comprises an interface configured to mate with the hook of the lens retainer;
wherein the lens retainer is configured to transition between (a) a clamped position, in which the second end is latched to the bridge and the body portion traverses respective front faces of the one or more lenses, and (b) a released position, in which the second end is unlatched and pivoted away from the bridge and the one or more lenses are removable from the frame.

2. The eyewear of claim 1, wherein the lens retainer is pivotably coupled to the central bridge by a hinge joint disposed at an upper portion of the bridge.

3. The eyewear of claim 2, wherein the body portion of the lens retainer comprises two members, each of the two members extending from a respective lateral end of the hinge joint to the distal second end of the lens retainer, such that a space is formed between the two members.

4. The eyewear of claim 1, wherein the one or more lenses comprise only a single shield-style lens engaging the left rim and the right rim.

5. The eyewear of claim 4, wherein the lens retainer comprises an aperture, and the single lens fills the aperture when the lens retainer is in the clamped position.

6. The eyewear of claim 1, wherein the one or more lenses comprise independent left and right lenses.

7. The eyewear of claim 1, wherein the one or more lenses comprise a plurality of peripheral cutouts configured to mate with corresponding peripheral protrusions of the left and right rims.

8. The eyewear of claim 7, wherein each of the peripheral protrusions of the left and right rims comprises a base portion configured to engage one of the cutouts and a distal flange configured to engage the front face of the lens.

9. Eyewear, comprising:
an eyewear frame including a left rim and a right rim;
a central bridge portion coupling the left rim to the right rim;
a lens retainer having a first end pivotably coupled to an upper member of the central bridge portion and a second end releasably latched to a lower member of the central bridge portion;
a portion of a lens disposed between and separating the upper member of the central bridge portion and the lower member of the central bridge portion, the lens disposed on a front side of the central bridge portion such that central bridge portion is disposed across a rear face of the lens, and the lens clamped to the frame by the lens retainer such that the lens retainer is disposed across a front face of the lens.

10. The eyewear of claim 9, wherein the lens retainer is pivotably coupled to the upper member of the bridge portion by a hinge, and the lens retainer comprises a trapezoidal flap having a base formed by the hinge.

11. The eyewear of claim 10, wherein the lens retainer comprises a pair of legs extending from respective ends of the hinge, such that at least one of the legs is disposed across a front face of the lens.

12. The eyewear of claim 11, wherein an aperture is defined between the legs of the lens retainer.

13. The eyewear of claim 9, wherein the lens is a unitary lens engaging both the left rim and the right rim.

14. The eyewear of claim 9, wherein the lens retainer is configured to unclamp the lens by unlatching the second end and pivoting the second end away from the frame.

15. The eyewear of claim 9, wherein the lens comprises one or more peripheral cutouts.

16. The eyewear of claim 15, wherein the frame comprises one or more flanged protrusions configured to mate with the one or more peripheral cutouts.

17. A method for replacing an eyewear lens, the method comprising:
unlatching a hook of a first end of a lens retainer flap from an interface of a lower member of a bridge portion of an eyewear frame, wherein a second end of the lens retainer flap is pivotably coupled to an upper member of the bridge portion;
pivoting the lens retainer flap away from the frame;
removing a first lens of the eyewear disposed on a front side of the frame;
replacing the first lens with a second lens; and
clamping the second lens to the frame by pivoting the lens retainer flap onto the second lens and latching the first end to the bridge portion.

18. The method of claim 17, wherein the second lens is a unitary lens configured to cover left and right eyes of a wearer.

19. The method of claim 17, wherein the lens retainer flap extends across a front face of the second lens when the first end is latched to the bridge portion.

20. The method of claim 17, wherein the first end latches to a nose portion of the bridge portion, and wherein the second end pivots about a brow portion of the bridge portion.

* * * * *